United States Patent
Al-Rubaiai et al.

(10) Patent No.: US 12,056,282 B1
(45) Date of Patent: Aug. 6, 2024

(54) ADAPTIVE TRIGGERS IMPLEMENTING SOFT ACTUATORS

(71) Applicant: Lemon Inc., Grand Cayman (KY)

(72) Inventors: Mohammed Al-Rubaiai, Los Angeles, CA (US); Ali Israr, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/217,843

(22) Filed: Jul. 3, 2023

(51) Int. Cl.
*G09G 5/00* (2006.01)
*G06F 3/01* (2006.01)

(52) U.S. Cl.
CPC .................................. *G06F 3/016* (2013.01)

(58) Field of Classification Search
CPC .......... G06F 3/01; G06F 3/016; G06F 3/0414; G06F 3/04483; G06F 3/04887; G06F 2203/04103
See application file for complete search history.

(56) References Cited

U.S. PATENT DOCUMENTS

| | | | | |
|---|---|---|---|---|
| 6,020,875 A * | 2/2000 | Moore | ................ | A63F 13/428 345/157 |
| 6,036,495 A * | 3/2000 | Marcus | ................ | G09B 9/28 434/45 |
| 6,429,849 B1 * | 8/2002 | An | ................ | G06F 3/016 345/161 |
| 7,318,361 B2 * | 1/2008 | Boutteville | ................ | G05G 5/03 74/518 |
| 8,545,323 B2 * | 10/2013 | McVicar | ................ | A63F 13/235 345/161 |
| 9,557,830 B2 * | 1/2017 | Grant | ................ | A63F 13/00 |
| 10,226,697 B2 * | 3/2019 | Schmitz | ................ | G05G 5/03 |
| 10,775,891 B2 * | 9/2020 | Sinclair | ................ | G05G 5/03 |
| 11,650,670 B2 * | 5/2023 | Drezet | ................ | G06F 3/0208 345/167 |
| 2004/0145563 A9 * | 7/2004 | Rosenberg | ................ | G06F 3/016 345/156 |
| 2005/0024331 A1 * | 2/2005 | Berkley | ................ | A61B 34/71 345/157 |
| 2012/0294696 A1 * | 11/2012 | Summer | ................ | G05B 19/409 700/264 |
| 2013/0194083 A1 * | 8/2013 | Rao | ................ | G06F 3/016 340/407.1 |
| 2013/0194085 A1 * | 8/2013 | Grant | ................ | A63F 13/285 340/407.2 |
| 2014/0266812 A1 * | 9/2014 | Rajkowski | ................ | G06F 3/0202 341/22 |
| 2016/0132116 A1 * | 5/2016 | Grant | ................ | G06F 3/016 345/156 |
| 2023/0372044 A1 * | 11/2023 | Lu | ................ | A61B 34/74 |

* cited by examiner

*Primary Examiner* — Joe H Cheng
(74) *Attorney, Agent, or Firm* — Faegre Drinker Biddle & Reath LLP (57) ABSTRACT

Devices, systems and methods related to systems and methods including user input devices with a user-actuatable trigger and a force-feedback soft actuator that is movably disposed with respect to the trigger. The soft actuator is made of a flexible material and is activatable based upon a force-feedback signal associated with the trigger to provide a user-perceived resistance to the trigger based upon the force-feedback signal.

20 Claims, 4 Drawing Sheets

ADAPTIVE TRIGGERS IMPLEMENTING SOFT ACTUATORS

TECHNICAL FIELD

This disclosure relates to user interface device, and more particularly to devices to facilitate sensory feedback to the user.

BACKGROUND

Haptic feedback technologies have the potential to greatly enhance user experience in a variety of applications, including gaming, virtual reality (VR), augmented reality (AR), and productivity input devices. However, existing technologies have limitations in terms of the amount and type of feedback that can be provided to the user. As such, further development is required in this field with regards to enhancing user experience.

SUMMARY

Devices, systems, and methods related to providing haptic feedback to users via the use of a soft actuator in the user input device are disclosed herein. For example, a user input device includes a rigid housing, a user-actuatable trigger supported by the housing, and a primary force-feedback soft actuator movably disposed between the trigger and the rigid housing.

In some examples, the primary soft actuator is made of a flexible material and is activatable based upon a force-feedback signal associated with the trigger. In some examples, the primary soft actuator is configured to provide a user-perceived resistance to the trigger based upon the force-feedback signal. In some examples, the device further includes a trigger sensor configured to detect a posture of the trigger, and the force-feedback signal is associated with the posture of the trigger as detected by the trigger sensor. In some examples, the trigger sensor is a pressure sensor.

In some examples, the device includes a position sensor configured to detect a position of the primary soft actuator, and the user-perceived resistance is adjustable based upon the position of the primary soft actuator as detected by the position sensor. In some examples, the primary soft actuator includes a magnet, and the position sensor is a magnetic sensor coupled to the magnet. In some examples, the magnet is positioned at a tip portion of the primary soft actuator proximate to the trigger.

In some examples, the user input device further includes: an additional force-feedback soft actuator disposed between the trigger and the rigid housing; a first pressure sensor configured to detect a first pressure applied to the primary soft actuator; and a second pressure sensor configured to detect a second pressure applied to the additional soft actuator. The user-perceived resistance is controllable based upon the pressures applied to the soft actuators.

In some examples, the device further includes a rigid component mechanically coupled to the trigger, a position of the rigid component being controlled by the soft actuators applying one or more forces to the rigid component to provide the user-perceived resistance to the trigger. In some examples, the rigid component is disposed between the primary and additional soft actuators, and the primary and additional soft actuators are positioned in opposing positions with respect to the rigid component.

In some examples, the device further includes a restoring member mechanically coupled to the rigid component and configured to return the position of the rigid component to an initial position in an absence of the force applied by the soft actuators. In some examples, the restoring member is a coil spring.

Also disclosed herein are haptic feedback systems. For example, the system includes a user input device which includes a rigid housing, a user-actuatable trigger, and a primary force-feedback soft actuator movably disposed between the trigger and the rigid housing. The system also includes a controller operatively coupled to the user input device. The controller is configured to: determine a force applied to the trigger, generate, based upon the force applied to the trigger, a force-feedback signal, and control a position of the primary soft actuator based upon the force-feedback signal to provide a user-perceived resistance to the trigger that is in or near real-time.

In some examples, the user input device further includes a trigger sensor configured to detect a posture of the trigger, and the controller is configured to determine the force applied to the trigger based upon the detected posture of the trigger. In some examples, the user input device further includes a position sensor configured to detect the position of the primary soft actuator, and the controller is configured to adjust the force-feedback signal based upon the detected position of the primary soft actuator.

In some examples, the user input device further includes: an additional force-feedback soft actuator disposed between the trigger and the rigid housing, a first pressure sensor configured to detect a first pressure applied to the primary soft actuator, and a second pressure sensor configured to detect a second pressure applied to the additional soft actuator, and the controller is configured to: generate, based upon the force applied to the trigger, a first force-feedback signal and a second force-feedback signal, and control the position of the primary soft actuator and the additional soft actuator based upon the first and second force-feedback signals to provide the user-perceived resistance to the trigger.

In some examples, the user input device further includes: a rigid component mechanically coupled to the trigger and disposed between the primary and additional soft actuators such that the primary and additional soft actuators are positioned in opposing positions with respect to the rigid component, where a position of the rigid component is controlled by the soft actuators applying one or more forces to the rigid component to provide the user-perceived resistance to the trigger. The user input device also includes: a restoring member mechanically coupled to the rigid component and configured to return the position of the rigid component to an initial position in an absence of the force applied by the soft actuators.

Also disclosed herein are methods of providing a sensory feedback to a user. In some examples, the method includes: determining, by a controller, a force applied to a trigger of a user input device; generating, by the controller based upon the force applied to the trigger, a force-feedback signal; and providing, by the controller, a user-perceived resistance to the trigger in or near real-time by controlling a position of a primary soft actuator of the user input device based upon the force-feedback signal. In some examples, the method further includes: receiving, by the controller from the primary soft actuator, a feedback indicative of a position of the primary soft actuator; and adjusting, by the controller, the force-feedback signal based upon the received feedback indicative of the position of the primary soft actuator.

BRIEF DESCRIPTION OF THE DRAWINGS

The implementations will be more readily understood in view of the following description when accompanied by the below figures, wherein like reference numerals represent like elements, and wherein.

DETAILED DESCRIPTION

Briefly, systems and methods include user input devices with a user-actuatable trigger and a force-feedback soft actuator that is movably disposed with respect to the trigger. By combining soft actuators with the trigger of the input devices, it is possible to create a more immersive and realistic user experience than would be otherwise possible using existing technologies, which may not provide enough resistance or may be limited in the technologies' ability to simulate certain actions or scenarios. Combining soft actuators with input devices, therefore, makes it possible to overcome these limitations and provide a more precise and immersive haptic feedback that better simulates real-world actions and scenarios in various different applications as further explained herein.

Figure 1:
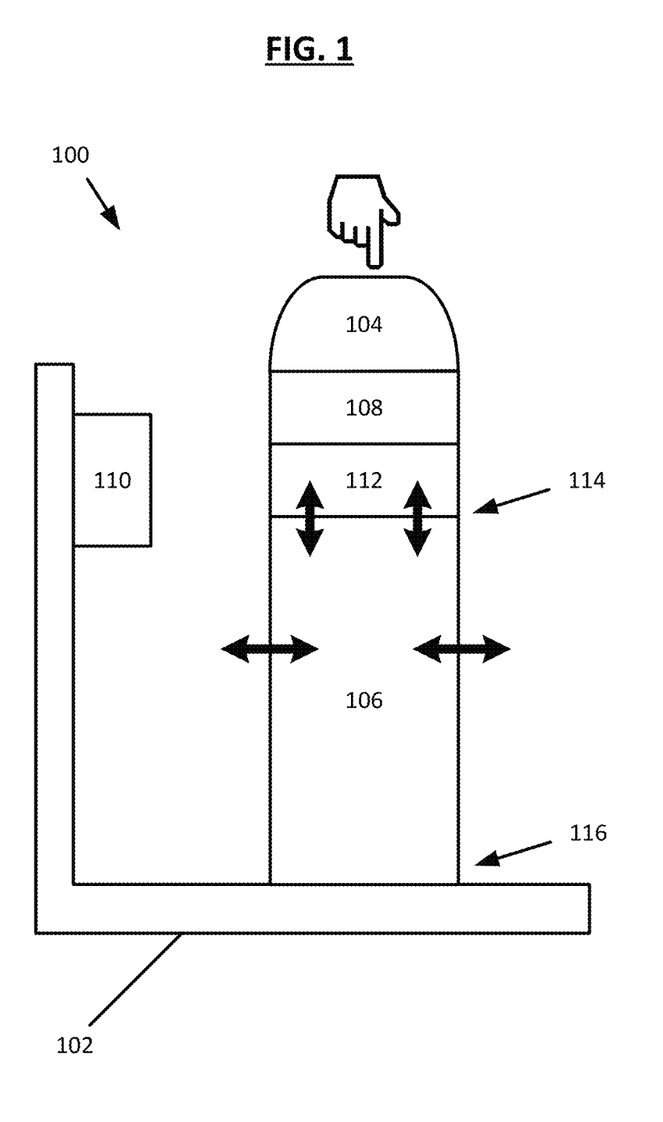
FIG. 1 shows a schematic diagram of a user input device according to examples disclosed herein.

Referring to FIG. 1, an exemplary user input device 100 is shown according to examples disclosed herein. The device 100 includes a rigid housing 102 and a user-actuatable trigger 104 supported by the housing 102, as well as a force-feedback soft actuator 106. The actuator 106 is movably disposed between the trigger 104 and the housing 102. The trigger 104 may be part of a user interface for any suitable application, including but not limited to gaming, virtual reality (VR), augmented reality (AR), and/or productivity input devices, among others. The trigger 104 may be implemented as any suitable input component that is controllable by the user when using such application as VR, AR, etc. The trigger 104 may be a button, a control stick, a handheld game controller, or any other suitable type of user-actuatable input mechanism or device as known in the art.

Soft actuators are a type of technology that may be used to create haptic feedback to the user in devices such as controllers. The soft actuator 106 may be made of a flexible material(s) that may change shape in response to an electrical signal, allowing for precise control over the amount and type of sensory feedback that is provided to the user. For example, the material may include but are not limited to electroactive polymers and elastomers that exhibit changes in size or shape upon electrical stimulation or stimulation by an electric field applied thereto and undergo deformation while sustaining large forces or pressures. Examples of such electroactive polymers may include but are not limited to ferroelectric polymers, electrostrictive graft polymers, electrostrictive paper, piezoelectric polymers, liquid crystal elastomers, ionic polymer metal composites (IPMC), conductive polymers (CP), ionic polymer gels (IPG), electrorheological fluids (ERF), dielectric polymers, electro-viscoelastic polymers, and so on. The soft actuator 106 may be formed using a single material (for example, a continuous, unitary, or monolithic component) or multiple materials (for example, having multiple parts or sub-components made of different materials). The electrical signal applied to the soft actuator 106 is also referred to as a force-feedback signal.

The soft actuator 106 may be a primary actuator if the actuator is the only one capable of facilitating the sensory feedback, or if the actuator provides the majority of the sensory feedback to the user. In some examples, there may be additional soft actuator(s) implemented, as further explained herein. The sensory feedback may be also referred to as a user-perceived resistance when the user is capable of perceive a resistance exerted from the device 100, for example from the trigger 104, in response to the user's applying a pressure or force to the trigger 104.

In some examples, the device 100 includes a trigger sensor 108 which detects a posture of the trigger 104. The trigger sensor 108 may be positioned relative to the trigger 104 so as to be capable of detecting any change in posture of the trigger 104 which may have been caused by a force or pressure being applied by the user to the trigger 104. For example, the sensor 108 may include one or more of a pressure sensor, a force sensor, a proximity sensor, a vector sensor, an ultrasonic sensor, an infrared sensor, a displacement or position sensor, a magnetic sensor, etc. The sensor 108 may be capable of detecting one or more of a position, a relative displacement, a force applied, a pressure applied, a movement directionality, and/or a speed/velocity of the trigger 104 as the user actuates the trigger. The force-feedback signal may thus be associated with the posture of the trigger 104 as detected by the sensor 108.

In some examples, the device 100 includes a position sensor 110 which detects a position of the soft actuator 106. The sensor 110 may be positioned relative to a portion of the soft actuator 106 so as to be capable of detecting any change in the position of the soft actuator 106. For example, the soft actuator 106 may deform toward or away from the sensor 110, which is detected by the sensor 110 that is disposed at a location that allows the sensor to detect and measure such change in position. For example, the position sensor 110 include one or more of a magnetic sensor, a displacement or position sensor, a proximity sensor, etc. The position of the soft actuator 106 as detected by the sensor 110 is then used to adjust the user-perceived resistance to the trigger 104. In some examples, the position sensor 110 and the trigger sensor 108 may be the same type of sensor, or a single sensor which may be capable of performing the functions of both sensors 108 and 110.

If either of the trigger sensor 108 or the position sensor 110 is a magnetic sensor, it is understood that there may be a separate magnet positioned in the component that is coupled with the respective sensor. For example, if the trigger sensor 108 is a magnetic sensor, there may be a magnet (not shown) coupled with or implemented in the trigger 104, and if the position sensor 110 is a magnetic sensor, there may be a magnet 112 which is included in or incorporated into the soft actuator 106, or otherwise attached, affixed, or fixedly coupled to the soft actuator 106. For example, the magnet 112 may be positioned at a predetermined location of the soft actuator 106 such as at a tip portion 114 of or anywhere along the body of the soft actuator 106. The tip portion 114 may be the portion of the soft actuator 106 that is proximate to the trigger 104 and is located opposite to a base portion 116 of the soft actuator 106. The base portion 116 may be attached or affixed to the housing 102, and the position sensor 110 may also be attached or affixed to the housing 102. In the example shown, the magnet 112 may be positioned between the trigger 104 and the rest of the soft actuator 106, and the trigger sensor 108 may be positioned between the trigger 104 and the magnet 112. As the soft actuator 106 deforms or deflects in a direction (for example, in any one or more of the directions indicated by the bold arrows shown in the figure), the position of the trigger 104 and the magnet 112 would similarly change in response to the deformation or deflection of the soft actuator 106.

Figure 2:
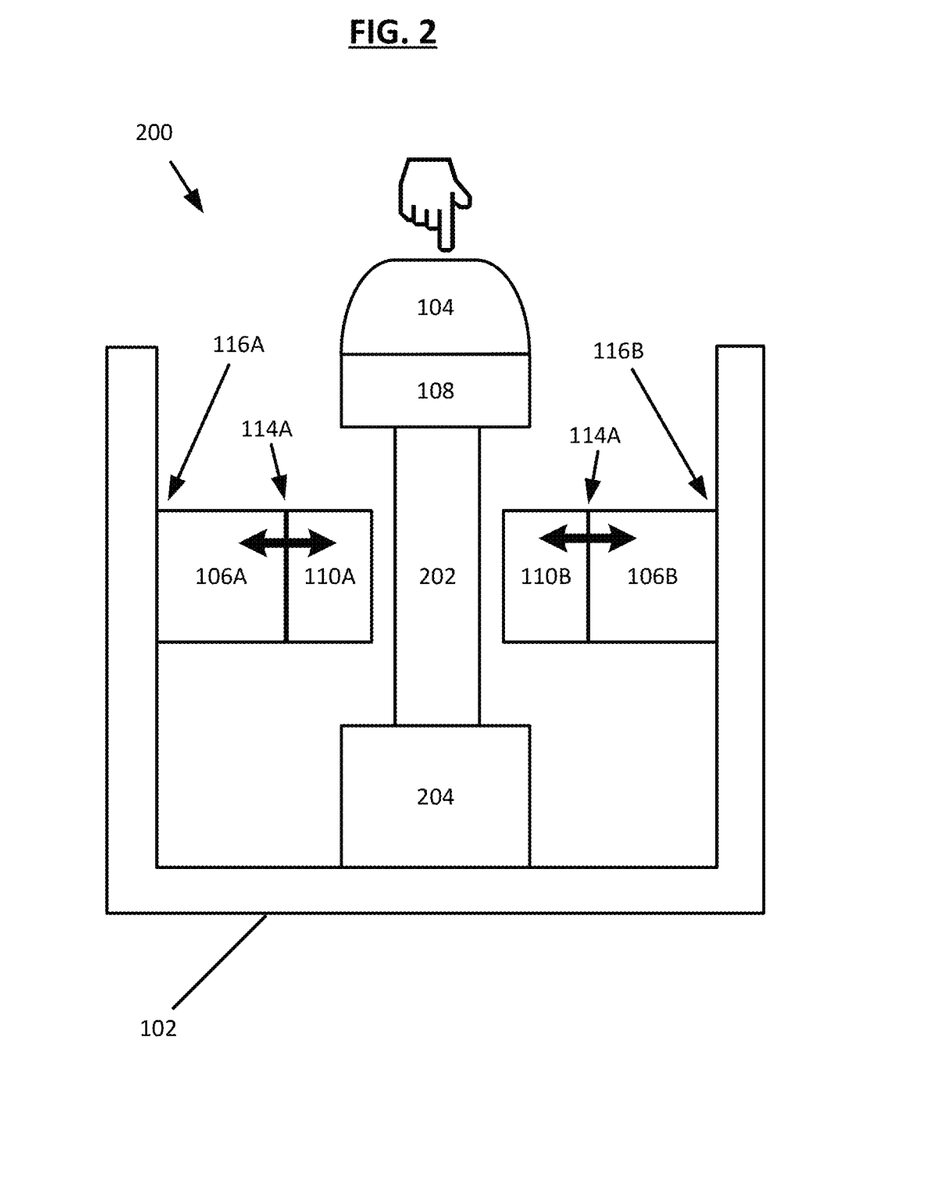
FIG. 2 shows a schematic diagram of another user input device according to examples disclosed herein.

FIG. 2 shows another exemplary user input device 200 according to examples disclosed herein. The device 200 includes the housing 102 and a user-actuatable trigger 104 supported by the housing 102, as well as two force-feedback soft actuators 106A and 106B (which may be referred to as a primary force-feedback soft actuator 106A and an additional force-feedback soft actuator 106B, or vice versa) which are separately operable or actuatable. The soft actuators 106A and 106B are movably disposed between the trigger 104 and the housing 102. The actuators 106A and 106B may be attached or affixed to different portions of the housing 102 to surround the trigger 104.

The soft actuators 106A and 106B may have two sensors 110A and 110B coupled thereto. The sensors 110A and 110B may be pressure sensors that detect the pressures applied to the soft actuators 106A and 106B. That is, the pressure sensor 110A may detect a pressure applied to the soft actuator 106A, and the pressure sensor 110B may detect a separate pressure applied to the soft actuator 106B. The user-perceived resistance may be thus controlled based upon the pressures applied to the soft actuators 106A and 106B, which are detected by the sensors 110A and 110B accordingly. The sensors 110A and 110B may be disposed or located at the tip portions 114A and 114B of the soft actuators 106A and 106B, respectively, while the base portions 116A and 116B attached or affixed to the housing 102 at different locations.

In the example shown, the device 200 includes a rigid component 202 that is mechanically coupled to the trigger 104 such that the position of the rigid component 202 may be controlled by the soft actuators 106A and 106B. The soft actuators 106A and 106B may each apply independently and separately a force to the rigid component 202 from different directions (for example, in the directions indicated by the bold arrows shown in the figure) in order to provide the user-perceived resistance to the trigger 104. In some examples, the forces applied by the soft actuators 106A and 106B may be caused by the deflections or deformations of the soft actuators, or by the lack thereof, such as the straightening of soft actuators that may have been previously deformed or deflected, such that the straightening of the soft actuators cause the force to be applied to the rigid component 202 in a direction and a speed (or force) as controlled by the force-feedback signal.

In the example shown, the rigid component 202 is disposed between the soft actuators 106A and 106B such that the soft actuators 106A and 106B are positioned in opposing positions with respect to the rigid component 202 so as to "squeeze" the rigid component 202 from both sides. The opposing positions may be defined as there being a 180-degree separation between the soft actuators 106A and 106B. The relative positions of the It is to be understood that, although there are only up to two soft actuators shown in the examples as illustrated, there may be more than two soft actuators implemented in other examples. In some examples, if there are additional soft actuators such that the total number of soft actuators may be three or more, the separation among the multiple soft actuators may vary depending on the number, for example defined by the equation $\theta=360/n$, where $\theta$ is the angle of separation in degrees, and n is the total number of soft actuators positioned around the rigid component 202. The rigid component 202 may be a rigid rod or a rigid member having any suitable shape including but not limited to a straight, curved, bent, or twisted configuration, for example.

In some examples, the device 200 also includes a restoring member 204 mechanically coupled to the rigid component 202 such that the restoring member 204 returns the position of the rigid component 202 to its initial position (also referred to as a default position or an original position) in the absence of any force being applied to the rigid component 202 by the soft actuators 106A and 106B. For example, if the initial position of the rigid component 202 is upright, but the soft actuators 106A and 106B cause the rigid component 202 to be angled or slanted, the restoring member 204 subsequently applies a restorative force to the rigid component 202 such that the rigid component 202 returns to its initial position when the soft actuators 106A and 106B stop applying the respective forces.

In some examples, the restoring member 204 may be a spring which exerts a restoring force according to Hooke's law, including but not limited to one or more of a coil spring, a torsion spring, a tension spring, a compression spring, a spiral spring, or any other suitable type of spring as known in the art. In some examples, multiple restoring members 204 may be implemented such as to be coupled to different portions of the rigid component 202 or to exert restorative forces in different directions and/or amplitudes. In some examples, the restoring member 204 may be or include any suitable mechanism or device implemented in the user input device 200 such that upon detecting (for example via a sensor) a lack or absence of external force being applied to the rigid component 202, the mechanism or device may apply a restorative force to return the rigid component 202 to its initial position. In such examples, the mechanism or device of the restoring member 204 may be controlled via a controller or processor.

Figure 3:
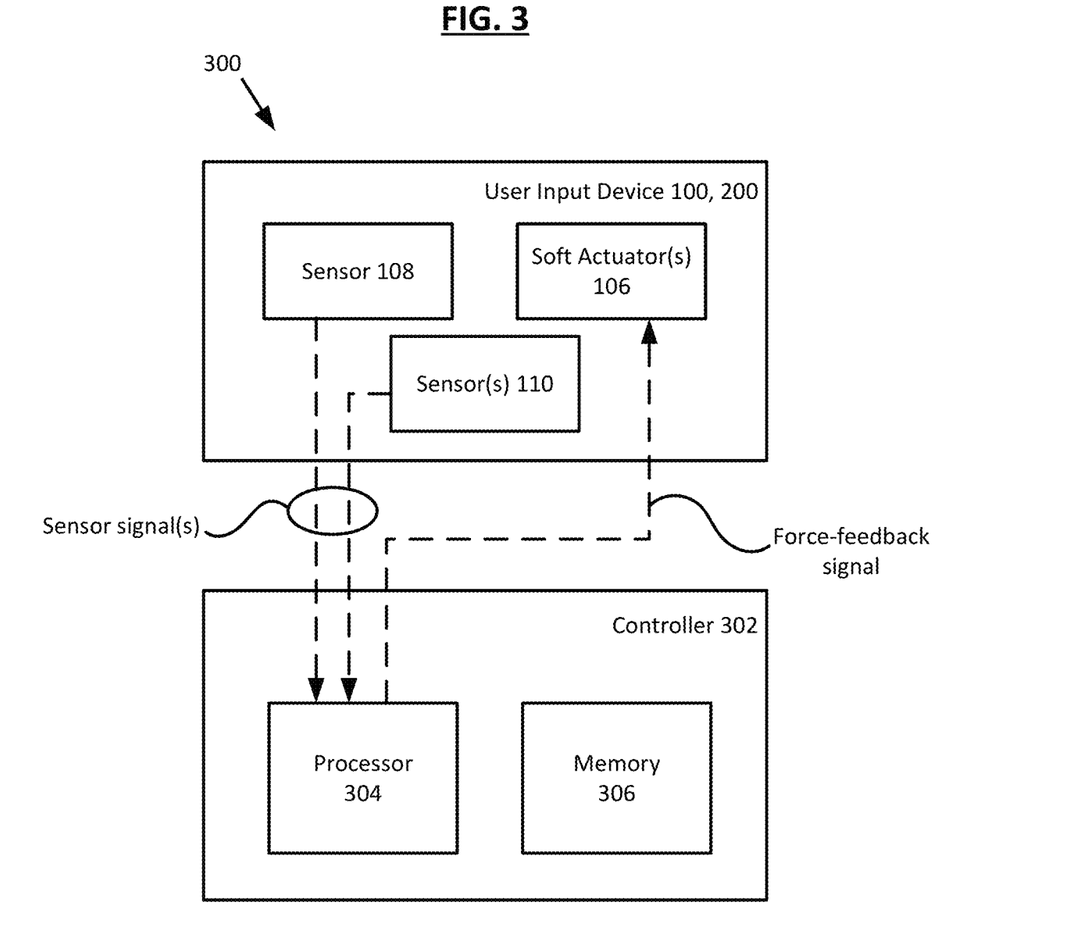
FIG. 3 shows a block diagram of a haptic feedback system according to examples disclosed herein.

FIG. 3 shows an exemplary haptic feedback system 300 according to examples disclosed herein. The system 300 includes the user input device 100 or 200 as disclosed herein, as well as a controller 302 operatively coupled to the device 100 or 200. The controller 302 is capable of sending signals to and receiving signals from the user input device 100 or 200 coupled therewith. The coupling may be electrical coupling, which may facilitate wired or wireless communication between the controller 302 and the device 100 or 200. In some examples, the controller 302 may be coupled to and control multiple devices simultaneously.

The controller 302 includes a processor 304 and memory 306. The memory 306 may include a non-transitory computer-readable storage medium which stores instructions which, when executed by one or more processors such as the processor 304, causes the processor(s) to perform certain methods, processes, or algorithms as further detailed herein. For example, the memory 306 may comprise, but is not limited to, volatile storage (e.g., random access memory), non-volatile storage (e.g., read-only memory), flash memory, or any combination of such memories. The memory 306 may include an operating system and one or more program modules suitable for running software applications capable of controlling the user input device 100 or 200. A number of program modules and data files may also be stored in the memory 306. While executing on the processing unit or processor 304, the program modules may perform processes including, but not limited to, the aspects as described herein. The controller 302 may also include additional data storage devices (removable and/or non-removable) such as, for example, magnetic disks, optical disks, or tape.

Examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where the processing components be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of a computing device on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general-purpose computer or in any other circuits or systems.

The controller 302 may be a computing device which may also have one or more input device(s) such as a keyboard, a mouse, a pen, a sound or voice input device, a touch or swipe input device, etc., and the user input device 100 or 200 may be any one or more of such input devices or incorporated into one or more of such input devices. Output device(s) such as a display, speakers, a printer, etc., may also be included. The aforementioned devices are examples and others may be used. The computing device may include one or more communication connections allowing communications with other computing devices. Examples of suitable communication connections include, but are not limited to, radio frequency (RF) transmitter, receiver and/or transceiver circuitry, universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The memory 306 as well as any removable storage device and non-removable storage device which may be implemented with or in the controller 302 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the controller 302. Any such computer storage media may be part of the controller 302 or computing device. Computer storage media does not include a carrier wave or other propagated or modulated data signal.

Communication media may be embodied by computer-readable or processor-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As further explained herein, the controller 302, or more specifically the processor 304 (or in some examples, multiple processors), may receive sensor signal(s) from the sensor(s) 108 and 110 as suitable. In return, the processor 304 may determine a force applied to the trigger 104, generate a force-feedback signal based upon the force applied to the trigger 104, and control a position of the soft actuator(s) 106 based upon the force-feedback signal to provide a user-perceived resistance to the trigger 104, where the user-perceived resistance may be experienced as a real-time response or a near real-time response. In some examples, a real-time response may be defined by a response which occurs in a period of time from about 1 μs to 10 μs, from about 10 μs to about 20 μs, from about 20 μs to about 50 μs, from about 50 μs to about 70 μs, from about 70 μs to about 100 μs (or 0.1 ms), from about 0.1 ms to about 0.2 ms, from about 0.2 ms to about 0.3 ms, from about 0.3 ms to about 0.4 ms, from about 0.4 ms to about 0.5 ms, from about 0.5 ms to about 0.7 ms, from about 0.7 ms to about 1 ms, from about 1 ms to about 2 ms, from about 2 ms to about 3 ms, from about 3 ms to about 5 ms, or any other suitable range therebetween or combination of ranges thereof, after the user actuates the trigger 104. In some examples, a near real-time response may be defined by a response which occurs in a period of time from about 5 ms to 10 ms, from about 10 ms to 15 ms, from about 15 ms to about 20 ms, from about 20 ms to about 50 ms, from about 50 ms to about 100 ms (or 0.1 second), or any other suitable range therebetween or combination of ranges thereof, after the user actuates or activates the trigger 104.

Figure 4:
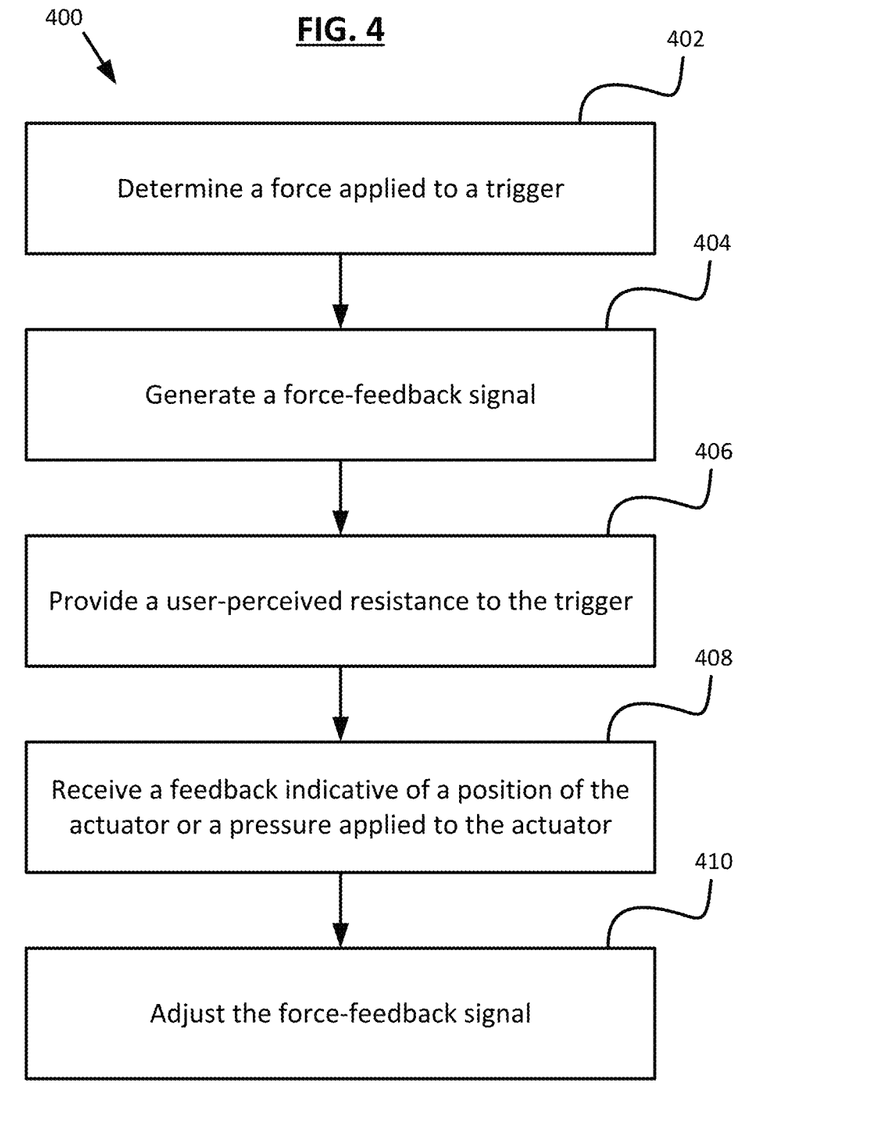
FIG. 4 shows a flow diagram of a method for providing a sensory feedback to a user according to examples disclosed herein.

FIG. 4 illustrates a flow diagram of a method or process 400 which may be performed by the controller 302 according to examples disclosed herein. In step 402, the controller determines a force applied to a trigger (for example, 104) such as by receiving at least one sensor signal from at least one trigger sensor (for example, 108) that is operatively coupled with the trigger to which the force is being applied. In step 404, based upon the force applied to the trigger, the controller generates a force-feedback signal indicative of an amount of sensory feedback or user-perceived resistance to be provided to the user in response to the force that was applied to the trigger. In step 406, the controller provides the user-perceived resistance to the trigger in or near real-time by controlling a position of a soft actuator (for example, 106) of the user input device based upon the force-feedback signal. In some examples, the controller may generate multiple force-feedback signals for multiple soft actuators (for example, 106A and 106B, such that one signal is generated for each soft actuator) in order for the controller to control multiple soft actuators separately and individually.

In step 408, the controller receives a feedback indicative of a position of the soft actuator, such as via a position sensor signal received from a position sensor (for example, 110) associated or coupled with the soft actuator, or a pressure applied to each of the soft actuators, such as via a pressure sensor signal received from pressure sensors (for example, 110A and 110B) associated or coupled with the soft actuators. In step 410, the controller adjusts the force-feedback signal(s) based upon the received feedback. In some examples, the adjustment may change the force-feedback signal(s) so as to silently and adaptively change the subsequent user-perceived resistance according to the received feedback.

There are numerous advantages in implementing such user input devices, haptic feedback systems, and methods for providing a sensory feedback to the user. The use of at least one soft actuator in the user input device, for example, allows for a user-perceived resistance directly to the trigger after the user actuates the trigger in such a way that the user-perceived resistance is influenced, controlled, or adjusted by how the user actuated the trigger, thereby providing the user with a more immersive experience in certain applications such as VR and AR in which the level of immersion offered by the application is an important factor that determines the user experience or satisfaction. Therefore, the flexible, adjustable, and adaptive nature of the haptic feedback as offered by the user input devices, haptic feedback systems, and methods disclosed herein, is beneficial in view of the above.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In other configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, sub-combinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

What is claimed is:

1. A user input device comprising:
   a rigid housing;
   a user-actuatable trigger supported by the rigid housing; and
   a primary force-feedback soft actuator movably disposed between the trigger and the rigid housing.

2. The user input device of claim 1, wherein the primary soft actuator is made of a flexible material and is activatable based upon a force-feedback signal associated with the trigger.

3. The user input device of claim 2, wherein the primary soft actuator is configured to provide a user-perceived resistance to the trigger based upon the force-feedback signal.

4. The user input device of claim 3, further comprising:
   a trigger sensor configured to detect a posture of the trigger, wherein the force-feedback signal is associated with the posture of the trigger as detected by the trigger sensor.

5. The user input device of claim 4, wherein the trigger sensor is a pressure sensor.

6. The user input device of claim 4, further comprising:
   a position sensor configured to detect a position of the primary soft actuator, wherein the user-perceived resistance is adjustable based upon the position of the primary soft actuator as detected by the position sensor.

7. The user input device of claim 6, wherein the primary soft actuator includes a magnet, and the position sensor is a magnetic sensor coupled to the magnet.

8. The user input device of claim 7, wherein the magnet is positioned at a tip portion of the primary soft actuator proximate to the trigger.

9. The user input device of claim 4, further comprising:
   an additional force-feedback soft actuator disposed between the trigger and the rigid housing;
   a first pressure sensor configured to detect a first pressure applied to the primary soft actuator; and
   a second pressure sensor configured to detect a second pressure applied to the additional soft actuator,
   wherein the user-perceived resistance is controllable based upon the pressures applied to the primary and additional soft actuators.

10. The user input device of claim 9, further comprising:
    a rigid component mechanically coupled to the trigger, a position of the rigid component being controlled by the primary and additional soft actuators applying one or more forces to the rigid component to provide the user-perceived resistance to the trigger.

11. The user input device of claim 10, wherein the rigid component is disposed between the primary and additional soft actuators, and the primary and additional soft actuators are positioned in opposing positions with respect to the rigid component.

12. The user input device of claim 10, further comprising:
    a restoring member mechanically coupled to the rigid component and configured to return the position of the rigid component to an initial position in an absence of the force applied by the primary and additional soft actuators.

13. The user input device of claim 12, wherein the restoring member is a coil spring.

14. A haptic feedback system comprising:
    a user input device including:
      a rigid housing,
      a user-actuatable trigger, and
      a primary force-feedback soft actuator movably disposed between the trigger and the rigid housing; and
    a controller operatively coupled to the user input device and configured to:
      determine a force applied to the trigger,
      generate, based upon the force applied to the trigger, a force-feedback signal, and
      control a position of the primary soft actuator based upon the force-feedback signal to provide a user-perceived resistance to the trigger that is in or near real-time.

15. The haptic feedback system of claim 14, wherein the user input device further includes a trigger sensor configured to detect a posture of the trigger, and the controller is configured to determine the force applied to the trigger based upon the detected posture of the trigger.

16. The haptic feedback system of claim 14, wherein the user input device further includes a position sensor configured to detect the position of the primary soft actuator, and the controller is configured to adjust the force-feedback signal based upon the detected position of the primary soft actuator.

17. The haptic feedback system of claim 14,
    wherein the user input device further includes:
      an additional force-feedback soft actuator disposed between the trigger and the rigid housing,
      a first pressure sensor configured to detect a first pressure applied to the primary soft actuator, and
      a second pressure sensor configured to detect a second pressure applied to the additional soft actuator,
    wherein the controller is configured to:
      generate, based upon the force applied to the trigger, a first force-feedback signal and a second force-feedback signal, and
      control the position of the primary soft actuator and the additional soft actuator based upon the first and second force-feedback signals to provide the user-perceived resistance to the trigger.

18. The haptic feedback system of claim 17, wherein the user input device further includes:

a rigid component mechanically coupled to the trigger and disposed between the primary and additional soft actuators such that the primary and additional soft actuators are positioned in opposing positions with respect to the rigid component, wherein a position of the rigid component is controlled by the primary and additional soft actuators applying one or more forces to the rigid component to provide the user-perceived resistance to the trigger, and a restoring member mechanically coupled to the rigid component and configured to return the position of the rigid component to an initial position in an absence of the force applied by the primary and additional soft actuators.

19. A method of providing a sensory feedback to a user, the method comprising:

determining, by a controller, a force applied to a trigger of a user input device;

generating, by the controller based upon the force applied to the trigger, a force-feedback signal; and providing, by the controller, a user-perceived resistance to the trigger in or near real-time by controlling a position of a primary soft actuator of the user input device based upon the force-feedback signal.

20. The method of claim 19, further comprising:

receiving, by the controller from the primary soft actuator, a feedback indicative of a position of the primary soft actuator; and adjusting, by the controller, the force-feedback signal based upon the received feedback indicative of the position of the primary soft actuator.

* * * * *